July 21, 1942. G. E. STILWELL 2,290,456
CONVEYER
Original Filed May 26, 1937
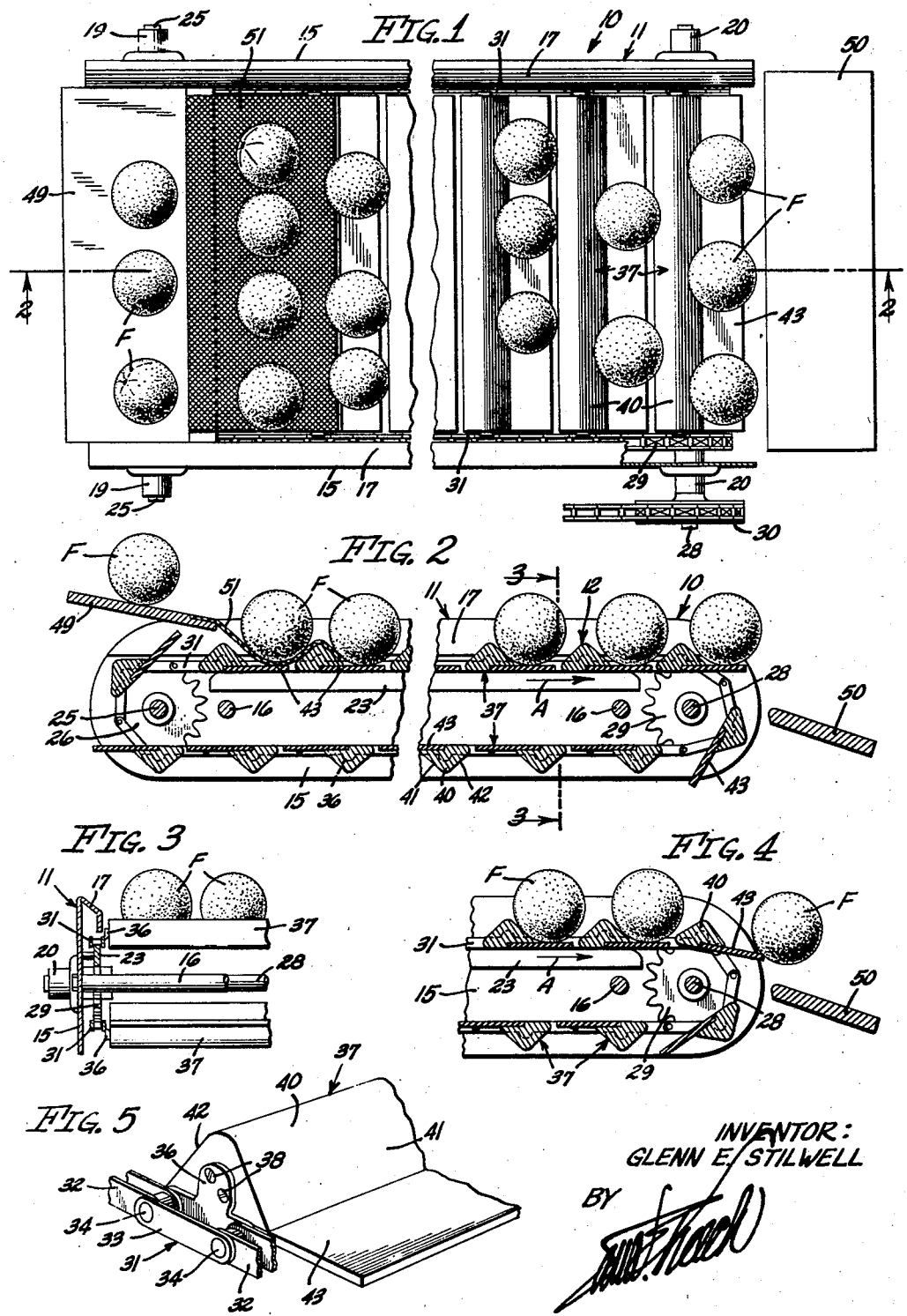
INVENTOR:
GLENN E. STILWELL
BY
ATTORNEY Patented July 21, 1942

2,290,456

UNITED STATES PATENT OFFICE 2,290,456

CONVEYER

Glenn E. Stilwell, Riverside, Calif., assignor to Food Machinery Corporation, San Jose, Calif., a corporation of Delaware Original application May 26, 1937, Serial No. 144,838. Divided and this application February 23, 1940, Serial No. 320,373

2 Claims. (Cl. 198—195)

My invention relates to conveyers for handling rollable articles and is particularly useful in the fruit packing industry for conveying fresh whole fruit.

The conveyer disclosed in this application has been divided out of my co-pending application for U. S. Letters Patent, Serial No. 144,838, filed May 26, 1937, for Sizer.

The general type of conveyer to which the present invention relates is known as the "slat" or "draper" type formed by mounting an endless series of slats transversely between a pair of endless chains trained about pairs of sprockets. Conveyers of this type are widely used in fruit packing houses for elevating, feeding and otherwise conveying loose fruit. In this type of conveyer, the fruit is carried in the channels formed between the adjacent cross-members and dropped from these channels onto a dropboard at the discharge end of the conveyer in a familiar manner.

A fault common to conveyers of this type is the tendency to pinch the smaller pieces of fruit between the moving cross-members and the stationary dropboard at the discharge end of the conveyer. Such dropboards are usually placed as high as possible to prevent dropping the fruit farther than necessary with the result that the said smaller pieces of fruit (which fall from the conveyer later than the larger pieces) often remain in the channels between the cross-members until pinched or actually crushed by the upper edge of the dropboard.

Such pinching can be prevented by placing the dropboard at a sufficient distance below the discharge end of the elevator to give the small pieces of fruit ample time to fall from the conveyer before being caught between the cross-members and the dropboard. This practice, however, often results in bruising of the fruit as the latter strikes the dropboard, this being particularly true when handling fruit which is easily bruised, such as lemons and pears.

An object of my invention is the provision of a conveyer for handling delicate, rollable articles which will not pinch nor bruise such articles as the latter are discharged from the conveyer onto a stationary dropboard.

Another object of this invention is the provision of a conveyer from which both small and large rollable articles may be discharged at substantially the same relatively high level without pinching the same, and thereby reduce the distance said articles drop when passing from the conveyer to the dropboard.

Further objects and advantages of this invention will be made manifest in the following description taken in connection with the accompanying drawing, in which Fig. 1 is a plan view of a preferred embodiment of the conveyer of my invention.

Fig. 2 is a longitudinal sectional view taken on the line 2—2 of Fig. 1.

Fig. 3 is a fragmentary vertical sectional view taken on the line 3—3 of Fig. 2.

Fig. 4 is a fragmentary view similar to Fig. 2 showing the manner in which rollable articles are discharged from the conveyer onto the dropboard.

Fig. 5 is a fragmentary perspective view showing the manner in which the slats of the conveyer of my invention are attached to the chains.

Referring specifically to the drawing, a conveyer 10, comprising a preferred embodiment of my invention, includes a frame 11, and an endless draper or carrier 12.

The frame 11 comprises a pair of said rails 15 held in spaced, parallel relation by spacer rods 16 as seen in Figs. 2 and 3. Upper portions of the side rails 15 are bent downward to provide aprons 17 which are co-extensive with the rails 15. Fixed on the rails 15 at opposite ends of the conveyer 10 are pairs of aligned bearings 19 and 20 shown in Fig. 1. Mounted on the innermost surface of each of the side rails 15 is a chain track 23 for supporting the upper flight of the carrier 12 as described hereinafter.

The carrier 12 includes an idle shaft 25 journalled in the bearings 19 as shown in Fig. 1. Fixed on the shaft 25 adjacent inner surfaces of the side rails 15 are sprockets 26. Journalled in the bearings 20 is a drive shaft 28 having sprockets 29 fixed thereon, the latter being aligned with the sprockets 26. Fixed on one end of the drive shaft 28 is a sprocket 30 by which the carrier 12 may be driven. Trained about aligned pairs of the sprockets 26 and 29 are endless chains 31. Each of the chains 31 includes plain links 32 and attachment links 33 joined by means of pins 34 as shown in Fig. 5. Each of the attachment links 33 has an ear 36 formed thereon. Upper flights of the chains 31 are supported by the tracks 23 as seen in Fig. 3.

Extending between the chains 35 is a plurality of slats 37 secured at their ends to the ears 36 of the attachment links 33 by means of screws 38 as shown in Fig. 5. Each of the slats 37 includes a cross-member 40 of a triangular cross-sectional shape providing front and rear wall surfaces 41 and 42 respectively. Fixed on and extending forwardly from the base portion of each of the cross-members 40 is a floor portion 43 preferably formed of a yieldable material such as heavy sheet rubber.

The term "zone of connection," appearing herein, relates to that portion of each of the slats 37 disposed between the axes of the pins 34 of the attachment links 33.

*Operation*

The conveyer 10 of my invention may be used in a packing house for conveying fruit horizontally or on an inclined plane and is particularly useful for feeding fruit to various fruit treating machines where it is desirable to feed the fruit in transverse rows.

To illustrate the manner in which the fruit is preferably fed to and taken from the conveyer 10, I have shown diagrammatically in Figs. 1 and 2 a delivery board 49 and a discharge or dropboard 50. The delivery board 49 is provided with a fabric apron 51 which extends over and lies on the slats 37. During operation, the shaft 28 is driven clock-wise as viewed in Fig. 2, causing the upper flight of the carrier 12 to move in the direction indicated by the arrows A of Figs. 2 and 4.

Fruit F rolls down the delivery board 49 from any suitable source of supply and is lowered gently onto the upper flight of the carrier 12 by the apron 51. The fruit settles onto the floor portions 43 of the slats 37 as seen in Fig. 2 and is separated into transverse rows by the triangular cross-members 40. As each of the slats 37 moves over the shaft 28, the floor portion 43 remains horizontal until the center of the cross-member 40 passes the axis of the shaft. As each of the slats 37 is rigidly mounted on oppositely aligned attachment links 33, each slat remains horizontal when arriving at the discharge end of the conveyer 10, as shown in Fig. 2, and maintains this horizontal position until the centers of the links 33 to which the slat is attached pass beyond the vertical plane of the axis of the shaft 28. When one of the slats 37 begins movement in an arcuate path about the shaft 28 as seen in Fig. 4, it will be noted that the floor portion 43 of this slat is disposed well in advance of the shaft 28 so as to lower the fruit gently onto the dropboard 50.

It will be seen in Fig. 2, that the diameters of the sprockets 29 are sufficiently small to cause the slats 37 arriving successively at the discharge end of the conveyer 10 to remain horizontal until the preceding slat is moved far enough down to avoid interfering with the free delivery of fruit from the following slat.

In the common types of slat and roller conveyers above mentioned, the transverse rows of fruit are usually supported by the two adjacent surfaces of the pairs of slats or rolls which form a V-shaped bottomless channel. It is to be noted that in applicant's conveyer the floor portion 43 of the slats 37 offers a flat, unbroken supporting surface for the pieces of fruit and that the fruit rolls more freely and readily from these floor portions at the discharge end of the conveyer than from the bottomless channels of the ordinary conveyers. Both large and small pieces of fruit of a transverse row thereof are delivered at substantially the same instant by applicant's conveyer and if desired this can be done at a higher level than in the ordinary slat or roller conveyer. Applicant thereby eliminates the danger of pinching small pieces of fruit against the edge of the dropboard and avoids bruising the fruit.

Although I have shown and described but one preferred form of the conveyer of my invention, it is to be understood that various modifications and changes might be made therein without departing from the spirit of the invention or the scope of the appended claims.

I claim as my invention:

1. In a conveyer for rollable articles, the combination of: an endless carrier; means for imparting continuous forward travel to said carrier; a plurality of closely juxtaposed transverse slats on said carrier, each of said slats having a ridge portion the width of which, at its base, occupies at least the rear half of said slat and a relatively low floor portion projecting forwardly therefrom; and means for mounting said slats on said carrier by rigidly fixing the ridge portions of said slats to said carrier.

2. In a conveyer for rollable articles, the combination of: an endless carrier; means for imparting continuous forward travel to said carrier; a plurality of transverse slats on said carrier said slats lying in close edge to edge relation, each of said slats having a ridge along the rear portion thereof, the width of each such ridge at its base being substantially equal to or greater than the distance which adjacent ridges are spaced apart at their bases on said conveyer, each slat also having a relatively low floor which extends forwardly from the ridge of said slat and substantially occupies the space between said ridge and the ridge of the slat next in advance thereof; and means for mounting said slats on said carrier by fixing the ridge portion of said slat to said carrier.

GLENN E. STILWELL.